US008175879B2

(12) United States Patent
Nitisaroj et al.

(10) Patent No.: US 8,175,879 B2
(45) Date of Patent: May 8, 2012

(54) SYSTEM-EFFECTED TEXT ANNOTATION FOR EXPRESSIVE PROSODY IN SPEECH SYNTHESIS AND RECOGNITION

(75) Inventors: Rattima Nitisaroj, Shrewsbury, MA (US); Gary Marple, Boxborough, MA (US); Nishant Chandra, Shrewsbury, MA (US)

(73) Assignee: Lessac Technologies, Inc., West Newton, MA (US)

( * ) Notice: Subject to any disclaimer, the term of this patent is extended or adjusted under 35 U.S.C. 154(b) by 943 days.

(21) Appl. No.: 12/188,763

(22) Filed: Aug. 8, 2008

(65) Prior Publication Data

US 2009/0048843 A1   Feb. 19, 2009

Related U.S. Application Data

(60) Provisional application No. 60/954,657, filed on Aug. 8, 2007.

(51) Int. Cl.
  *G10L 19/00* (2006.01)
(52) U.S. Cl. .......................... 704/260; 704/251; 704/258
(58) Field of Classification Search .................. 704/251, 704/258, 260
See application file for complete search history.

(56) References Cited

U.S. PATENT DOCUMENTS

| | | | |
|---|---|---|---|
| 6,260,016 | B1 | 7/2001 | Holm et al. |
| 6,847,931 | B2 * | 1/2005 | Addison et al. ............... 704/260 |
| 6,865,533 | B2 | 3/2005 | Addison et al. |
| 6,963,841 | B2 | 11/2005 | Handal et al. |
| 7,280,964 | B2 | 10/2007 | Wilson et al. |
| 7,606,710 | B2 * | 10/2009 | Wang et al. .................... 704/260 |
| 2003/0144842 | A1 | 7/2003 | Addison et al. |
| 2003/0163316 | A1 | 8/2003 | Addison et al. |
| 2003/0182111 | A1 | 9/2003 | Handal et al. |
| 2003/0229497 | A1 | 12/2003 | Wilson et al. |
| 2004/0193398 | A1 * | 9/2004 | Chu et al. ........................... 704/3 |
| 2005/0182629 | A1 | 8/2005 | Coorman et al. |
| 2005/0273338 | A1 * | 12/2005 | Aaron et al. .................. 704/267 |

(Continued)

OTHER PUBLICATIONS

International Search Report and Written Opinion dated Nov. 5, 2008 for the International PCT Patent Application No. PCT/US08/72624.

(Continued)

*Primary Examiner* — Daniel D Abebe
(74) *Attorney, Agent, or Firm* — K&L Gates LLP

(57) ABSTRACT

The inventive system can automatically annotate the relationship of text and acoustic units for the purposes of: (a) predicting how the text is to be pronounced as expressively synthesized speech, and (b) improving the proportion of expressively uttered speech as correctly identified text representing the speaker's message. The system can automatically annotate text corpora for relationships of uttered speech for a particular speaking style and for acoustic units in terms of context and content of the text to the utterances. The inventive system can use kinesthetically defined expressive speech production phonetics that are recognizable and controllable according to kinesensic feedback principles. In speech synthesis embodiments of the invention, the text annotations can specify how the text is to be expressively pronounced as synthesized speech. Also, acoustically-identifying features for dialects or mispronunciations can be identified so as to expressively synthesize alternative dialects or stylistic mispronunciations for a speaker from a given text. In speech recognition embodiments of the invention, each text annotation can be uniquely identified from the corresponding acoustic features of a unit of uttered speech to correctly identify the corresponding text. By employing a method of rules-based text annotation, the invention enables expressiveness to be altered to reflect syntactic, semantic, and/or discourse circumstances found in text to be synthesized or in an uttered message.

20 Claims, 14 Drawing Sheets

U.S. PATENT DOCUMENTS

| | | | |
|---|---|---|---|
| 2007/0203703 A1* | 8/2007 | Yoshida | 704/260 |
| 2007/0260461 A1* | 11/2007 | Marple et al. | 704/260 |
| 2008/0195391 A1 | 8/2008 | Marple et al. | |

OTHER PUBLICATIONS

M. Atterer, Assigning Prosodic Structure for Speech Synthesis via Syntax-Prosody Mapping, Master's thesis, University of Edinburgh (2000).

J. Bachenko et al. "A Computational Grammar of Discourse-Neutral Prosodic Phrasing in English," Computational Linguistics, vol. 16, pp. 155-170 (1990).

J. Bos, "Towards Wide-Coverage Semantic Interpretation," Proceedings of Sixth International Workshop on Computational Semantics (IWCS-6), pp. 42-53 (2005).

S. Clark et al. "Parsing the WSJ." Proceedings of the 42nd annual Meeting of the Association for Computational Linguistics (ACL-04), ), pp. 104-111, Barcelona, Spain (2004).

J. Hirschberg, "Pitch Accent in Context: Predicting Intonational Prominence from Text," Artificial Intelligence, vol. 63, pp. 305-340 (1993).

L. Hiyakumoto et al., "Semantic and Discourse.." Concept to Speech Generation Systems, Proceedings of Workshop Sponsored by Assoc. for Computational Linguistics, pp. 47-56 1997.

M. Horne et al., "Referent Tracking in Restricted Texts Using a Lemmatized Lexicon.." Proceedings of the European Conference on Speech Techonology, pp. 2011-2014 (1993).

D. Litman et al. "Disambiguating Cue Phrases in Text and Speech," Proceedings of the 13th Conference on Computational Linguistics, pp. 251-256 (1990).

S. Prevost., A Semantic of Contrast and Information Structure for Specifying Intonation in Spoken Language Generation, PhD diss., University of Pennsylvania (1995).

R. R. Pfeiffer "Session A. Physiological Acoustics I..", Program of the Eighty-Fourth Meeting of the Accoustical Society of America, Miami Beach, Florida, 1972.

* cited by examiner

- obtain base forms of nouns, verbs, adjectives, and adverbs from WordNet
- for each word W (noun, verb, adjective, adverb){
    - check against words in history( )
    - if matched, tag W as "given"
    - else, add W to history( ) }
- clear up history( ) at the end of paragraph

- If one of the following patterns is found, mark the pronoun in the second sentence as "contrastive". (get the base form of verbs tagged with VBD/VBP/VBZ from WordNet before matching with the patterns)
    - NP VBD/VBP/VBZ$_i$ ..... (However, | On the other hand, | But | but) I/you/he/she/it/we/they doesn't/don't/didn't/does not/do not/did not (VB$_i$ ... | . )
    - NP has/have/had VBN$_i$ ..... (However, | On the other hand, | But | but) I/you/he/she/it/we/they hasn't/haven't/hadn't/has not/have not/had not (VBN$_i$ ... | . )
    - NP doesn't/don't/didn't/does not/do not/did not VB$_i$ ... (However, | On the other hand, | But | but) I/you/he/she/it/we/they (VBD/VBP/VBZ$_i$ ... | does/do/did.)
    - NP hasn't/haven't/hadn't/has not/have not/had not VBN$_i$ ... (However, | On the other hand, | But | but) I/you/he/she/it/we/they has/have/had (VBN$_i$ ... | . )
    - NP VBD/VBP/VBZ$_i$ ..... (And / and) I/you/he/she/it/we/they VBD/VBP/VBZ$_i$ ... too. (note: materials in parentheses are optional)
    - NP has/have/had VBN$_i$ ..... (And / and) I/you/he/she/it/we/they has/have/had (VBN$_i$) ... too. (note: materials in parentheses are optional)

Figure 3

- Cue phrases in sentence-initial position and followed by a comma cannot be operative word:

| | | |
|---|---|---|
| On the other hand | As a result | In addition |
| In the beginning | In the end | At first |
| Initially | Actually | Anyway |
| Basically | Consequently | However |
| Nonetheless | Nevertheless | Moreover |
| Furthermore | Further | Therefore |
| Eventually | Finally | Next |
| Then | Later | Now |
| Well | | |

Figure 4

```
For each sentence {
    -   insert a primary break, ||, after every period, semi-colon, colon, and question mark
    -   insert a secondary break, |, after every comma
    -   count the number of syllables between two primary breaks, i.e., ||...||, or between the sentence beginning and || 'chunk_syls'
    -   if (chunk_syls > 25) {
        -   count the numbers of words to the left of | from the preceding |, ||, or the sentence beginning 'left_words'
        -   count the numbers of words to the right of | until the next | or || 'right_words'
        -   For each | {
            -   if (left_words > 2 AND right_words > 2) { change | to || } }
    -   count chunk_syls
    -   while (chunk_syls > 25) {
        -   if ( string matches [NP  ] [VP – only the highest one in the structure ) {
            -   count the number of words within the NP brackets  'words_in_subj'
            -   if (words_in_subj > 4) { insert || between subject and predicate } }
        -   else if ( string matches one of these patterns:
                        and [S or [SBAR or [VP
                        but [S or [SBAR or [VP
                        as [S
                            [S [VP to
                            [PP where [S
                            [SBAR ) {
            -   if the previous break is located within 5 word position away, find the next matching pattern
            -   else, insert || after the word preceding the found pattern }
        -   else {
            -   the optimum_lengh is chunk_syls / 2
            -   go optimum_length syllables forward
            -   go further until reaching the end of the nearest NP
            -   insert || }
        -   count chunk_syls }}
```

Figure 5

- After discourse rules, mark "contrastive" words as operative word (Op)
- For each phrase (defined as material from sentence beginning to a break, or from one break to another)
  - if no operative word present AND the phrase doesn't constitute a cue phrase {
    - look for the following in a strict order: patient > theme > agent > predicate
    - if the found element has modifier as identified by the grammatical relation labeler {
      - 1 modifier {
        - if the modifier 'mod1' has a modifier 'mod2' mark 'mod2' as Op
        - else, mark the modifier as Op }
      - 2 or more modifiers { mark the modifier in the earliest sentential position as Op } }
    - else, mark the found element as Op
  - else, exit.
- For all of the above,
  - if Op = "given", skip to the next rule
  - else, mark as Op.

Figure 6

- At sentence level, look for the following patterns:
  - Mark proper nouns in the first sentence of the paragraph as operative word (Op)
    NNP NNP
    NNP

- Constructions with *and* or *or*
    [NP$_i$ [NP$_j$ _____ NP$_j$] and/or [NP$_k$ _____ NP$_k$] NP$_i$]
    - phrase1 = material before *and/or*
    - phrase2 = material after *and/or*
    for each phrase {
      - if the phrase constitutes NP with 'of' {
        - if both sides of 'of' have a modifier, mark the modifier on the left side as Op
          *more/most/less/least* JJ/RB
          RB/RBR JJ (RBR is not *more*, and RB is not *not*)
          JJ/JJR/JJS NN/NNS
          JJ VBG/VBN NN/NNS
          DT VBG/VBN NN/NNS
          NN/NNP NN/NNS
        - if one side of 'of' has a modifier, mark the modifier as Op
        - if no modifier (adj/noun) on either side of 'of', mark NN/NNS in the left side as Op}
      - elsif the phrase has a modifier, mark the modifier as Op (follow the above patterns of part-of-speech sequences)
      - else, mark NN/NNS/NNP in the phrase as Op } }

- Noun modified by a clause
    [NP$_i$ _____ [VP$_i$ _____ VP$_i$] NP$_i$]
    [NP$_i$ _____ [SBAR$_i$ _____ SBAR$_i$] NP$_i$]
    [NP$_i$ _____ [PP$_i$ _____ [S$_i$ _____ S$_i$] PP$_i$] NP$_i$]

Figure 7A

[NP$_i$ _____ [ADJP$_i$ _____ ADJP$_i$] NP$_i$]
[NP$_i$ _____ [S$_i$ _____ S$_i$] NP$_i$]
(the material before VP, SBAR, PP, ADJP, and S can be NP)
- phrase3 = material before VP, SBAR, PP, ADJP, S
if phrase3 has a modifier, follow the above patterns of POS sequences
else, mark NN/NNS/NNP in phrase3 as Op

- At phrase level (material from sentence beginning to a break, or from one break to another), if no operative word present AND the phrase doesn't constitute a discourse marker, mark the underlined element as Op. Keep strict order of the rules. Whenever a rule is satisfied for a phrase, exit and go to the next phrase.

- Cardinal numbers
  CD CD <u>CD</u> (the last CD is *thousand or million or billion*)
  CD <u>CD</u>
  <u>CD</u>

- Constructions with *more/most*
  *more/most/less/least* <u>JJ/RB</u>
  VB/VBD/VBG/VBN/VBP/VBZ *more*
  <u>JJR/JJS</u> *than*

- NP constructions with 'of', defined as follows:
  [NP$_i$ [NP$_j$ _____ NP$_j$] [PP$_i$ of [NP$_k$ _____ NP$_k$] PP$_i$] NP$_i$]
  {
  - if both sides have a modifier, mark the modifier on the left side as Op
    *more/most/less/least* <u>JJ/RB</u>
    RB/RBR <u>JJ</u> (RBR is not *more*, and RB is not *not*)
    <u>JJ/JJR/JJS</u> NN/NNS
    <u>JJ</u> VBG/VBN NN/NNS
    DT VBG/VBN <u>NN/NNS</u>
    <u>NN/NNP</u> NN/NNS
  - if one side has a modifier, mark the modifier as Op
  - if no modifier (adj/noun) on both sides, mark NN/NNS to the left of 'of' as Op}

Figure 7B

- Constructions with adverb
  RB/RBR JJ
  RB/RBR VB/VBD/VBG/VBN/VBP/VBZ
  VB/VBD/VBG/VBN/VBP/VBZ RB/RBR
  RB/RBR MD
  RB RB
  Note: RBR is not 'more' and RB is not 'not'

- Constructions with adjective
  BE JJ/JJR/JJS
  JJ/JJR/JJS NN/NNS
  JJ VBG/VBN NN/NNS ex. *final resting place, nationwide automated system*
  DT VBG/VBN NN/NNS ex. *a democratizing influence, the exploited class*

- Extended NP
  NN/NNP NN/NNS/NNP

- Infinitive verbs
  *try to* VB
  *begin to* VB
  *used to* VB

- If none of the above rules can apply, mark JJ/JJS that is closest to the break as Op. If no JJ/JJS, mark NN/NNS/NNP.
If no NN/NNS/NNP, mark VB/VBD/VBG/VBN/VBP/VBZ.

Figure 7C

\# within words, not word-initial
    \# connectives
    - insert Y connective before a vowel if it is preceded by the vowel Y-buzz, +Y-buzz, 6y, or 3y
    - insert W connective before a vowel if it is preceded by y1, 1, 21, or 51

\# consonant blends
    - mark the first consonants in the following sequences with a single underline: BL, BR, GL, GR, KL, KR, PL, PR, DR, TR, KW
    - mark the first consonants in the following sequences with a double underline: FL, FR \# playable consonants
    - mark TS or DZ with a single underline when followed by any consonant except S and Z
    - mark CH or DG with a single underline when followed by any consonant
    - mark DH or TH with a double underline when followed by any consonant except DH and TH
    - mark SH or ZH with a double underline when followed by any consonant except SH and ZH
    - mark NG with a double underline when followed by any consonant
    - mark B or P with a single underline when followed by any consonant except B, P, and M
    - mark D or T with a single underline when followed by any consonant except D, N, S, T, Z, CH, DH, SH, TH, ZH, DG, TS, DZ, and woodblock clicks
    - mark G or K with a single underline when followed by any consonant except G and K
    - mark F or V with a double underline when followed by any consonant except F and V
    - mark S or Z with a double underline when followed by any consonant except S and Z
    - mark L, M, N with a double underline when followed by any consonant
    - mark B, D, G, K, P, T, CH, DG, TS or DZ with a single underline when followed by a comma, a semi-colon, a colon, or a primary break
    - mark F, L, M, N, S, V, Z, DH, SH, TH, ZH, or NG with a double underline when followed by a comma, a semi-colon, a colon, or a primary break

Figure 8A prepared consonants
- mark D or T as part of woodblock clicks with a forward slash
- mark D with a forward slash when followed by CH, DH, SH, TH, ZH, DG, N, T, S, or Z
- mark T with a forward slash when followed by CH, DH, SH, TH, ZH, DG, D, N, S, or Z
- mark B with a forward slash when followed by M or P.
- mark P with a forward slash when followed by B or M.
- mark K with a forward slash when followed by G.

between words
  # prepare and link
  - mark TS or DZ with a forward slash and a linking symbol when followed by Z or S
  - mark DH or TH with a forward slash and a linking symbol when followed by DH or TH
  - mark SH or ZH with a forward slash and a linking symbol when followed by SH or ZH
  - mark F or V with a forward slash and a linking symbol when followed by F or V
  - mark S or Z with a forward slash and a linking symbol when followed by S or Z
  - mark B or P with a forward slash and a linking symbol when followed by B, P, or M
  - mark D or T with a forward slash and a linking symbol when followed by D, N, T, S, Z, CH, DH, SH, TH, ZH, or DG
  - mark G or K with a forward slash and a linking symbol when followed by G or K
  - mark L with a forward slash and a linking symbol when followed by L
  - mark M with a forward slash and a linking symbol when followed by M
  - mark N with a forward slash and a linking symbol when followed by N
  - mark R with a forward slash and a linking symbol when followed by R woodblock clicks
- mark D or T as a woodblock click when followed by L

Figure 8B play and link
- mark TS or DZ with a single underline and a linking symbol when followed by any consonant except S and Z
- mark CH or DG with a single underline and a linking symbol when followed by any consonant
- mark DH or TH with a double underline and a linking symbol when followed by any consonant except DH and TH
- mark SH or ZH with a double underline and a linking symbol when followed by any consonant except SH and ZH
- mark NG with a double underline and a linking symbol when followed by any consonant
- mark B or P with a single underline and a linking symbol when followed by any consonant except B, P, and M
- mark D or T with a single underline and a linking symbol when followed by any consonant except D, N, S, T, Z, CH, DH, SH, TH, ZH, DG, TS, DZ, and woodblock clicks
- mark G or K with a single underline and a linking symbol when followed by any consonant except G and K
- mark F or V with a double underline and a linking symbol when followed by any consonant except F and V
- mark S or Z with a double underline and a linking symbol when followed by any consonant except S and Z
- mark L, M, N with a double underline and a linking symbol when followed by any consonant direct link
- mark a consonant with a linking symbol when followed by a vowel connectives
- insert Y connective before a vowel if the final vowel in the preceding word is Y-buzz, +Y-buzz, 6y, or 3y
- insert W connective before a vowel if the final vowel in the preceding word is y1, 1, 21, or 51

Figure 8C

- For each phrase {
  - If operative word {
    - If word has 4 or more syllables AND contains the pattern 2 ... 1 (i.e., a secondary-stressed syllable preceding a primary-stressed syllable. Greedy matching – encompass any 2 and 1 in between. No other primary-stressed syllable can come before the secondary-stressed syllable.) {
      - The matched secondary-stressed syllable is assigned a large dot at level 3
      - The matched primary-stressed syllable is assigned a large dot at level 2
      - For syllables within the matched pattern {
        - Primary-stressed syllable is assigned a large dot at level 2
        - Secondary-stressed syllable is assigned a large dot at level 2
        - Unstressed syllable is assigned a small dot at level 2 }
      - For syllables outside the matched pattern {
        (- Primary-stressed syllable shouldn't be found)
        - Secondary-stressed syllable is assigned a large dot at level 1
        - Unstressed syllable is assigned a small dot at level 1 }
    - Else {
      - Primary-stressed syllable is assigned a large dot at level 3
      - Secondary-stressed and unstressed syllables are assigned a dot (large for secondary-stressed, and small for unstressed) at level 2 and 1 (downtrend for polysyllabic words) }
  - Else {
    - If content word (e.g., Noun, Verb, Adjective, Adverb, Quantifier) {
      - Primary-stressed syllable is assigned a large dot at level 2
      - Secondary-stressed syllable is assigned a large dot at level 1
      - Unstressed syllable is assigned a small dot at level 1 }
    - Else (function word, e.g., Auxiliary verb, Article, Preposition, Pronoun, Conjunction) {
      - If monosyllabic word, assign a small dot to level 1
      - Else (i.e., polysyllabic word) {
        - Primary-stressed syllable is assigned a large dot at level 2
        - Secondary-stressed syllable is assigned a large dot at level 1
        - Unstressed syllable is assigned a small dot at level 1 }}
  - Syllables immediately preceding a level-3 syllable receive a dot at level 2

Figure 9

Then,
- For each word preceding a period or a semi-colon {
    - if there is 3iH, insert downglide (3iH -> 3iHfW), then exit
    - if there is 2iH that is not followed by 2iLfW or 2iHfW (from polysyllabic word adjustment rule), insert downglide (2iH -> 2iHfW) }
- For each word preceding a breath pause ( || with no period or semi-colon preceding it ) {
    - if monosyllabic {
        - 3iH, insert fD (80%) or fN (20%)
        - 2iH {
            - if followed by a main verb, insert downcircumflex 2iH -> 2iHfD
            - else, insert downglide (2iH -> 2iHfW) }}
    - if polysyllabic, check last vowel {
        - 3iH, insert fW (70%), or fN (30%)
        - 2iH, insert fW (80%), or fN (20%)
        - 2iL, insert fW (50%), fN (40%), or fS (10%)
        - 1iH, insert fN (65%), or fU (35%)
        - 1iL, insert fN (75%), or fU(25%) }}
- For each word preceding a phrase boundary ( | ), check the last vowel {
    - 3iH, insert fW (40%), fD (30%), fN (20%), or fS (10%)
    - 2iH, insert fN (40%), fW (35%), fS (15%), or fD (10%)
    - 1iH, insert fU (70%), fW (15%), or fN (15%)
    - 2iL, insert fN (70%), fW (20%), or fS (10%)
    - 1iL, insert fU (30%), or fN (70%)}
Then, add fN to all other syllables.

Figure 11

SYSTEM-EFFECTED TEXT ANNOTATION FOR EXPRESSIVE PROSODY IN SPEECH SYNTHESIS AND RECOGNITION

CROSS REFERENCE TO A RELATED APPLICATION

This application claims the benefit of provisional patent application No. 60/954,657, filed on Aug. 8, 2007, the disclosure of which is incorporated by reference herein.

This invention relates to methods of for providing expressive prosody in speech synthesis and recognition and to computerized systems configured to implement the methods.

BACKGROUND OF THE INVENTION

Considerable research and development by various laboratories, universities, and companies, have attempted for several decades to automate the process of annotating text to improve pronunciations by speech synthesizers.

Arthur Lessac's book, "*The Use and Training of the Human Voice*," (3$^{rd}$ Edition) is described as being based on over forty years of research and experience. It is used as a teacher's guide for instructing theatrical stage performers. His work describes a scientifically developed, and carefully validated, kinesensic theory of voice training and use. "Kinesensics" is known as a systematic study of the relationship between nonlinguistic body motions, for example blushes, shrugs, or eye movement, and communication. Arthur Lessac extended the usage to include resonant feedback of sound production and controllable body changes that can add effect to the spoken content. Experimentation and validation of this work continues today through members and associates of the Lessac Institute (www.lessacinstitute.com). Arthur Lessac's work led him to observe that "music is speech and speech is music." While vowels were viewed as musically significant, Arthur Lessac also demonstrated that consonants themselves are musical and can be considered as a musical "orchestra" in their own right.

The effect of kinesensic instruction is often demonstrable. Acoustic data for speakers trained using the Lessac method have been shown to have speech and musical formants simultaneously present in their speech. Furthermore, their abilities to consciously control pitch change profiles, inflections, and articulatory variations in their speech are superior to those who have not been trained using kinesensic feedback principles.

International patent publication No. WO 2005/088,606 discloses a method of prosodic text coding for use in computerized speech systems.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

SUMMARY OF THE INVENTION

In one aspect, the inventive system automatically effects text annotation indicating the relationship of text to be pronounced as expressive speech, and of expressive speech utterances to be correctly recognized as text. The annotations can be comprised of grapheme-phoneme pairs, each pair having a visible prosodic-indicating grapheme corresponding to the text to be pronounced, and a corresponding phoneme that is functional in the digital domain.

In another aspect, the invention provides a computer-implemented rule-based method of synthesizing speech from text. The method comprises inputting text to be machine spoken to a computerized system, system identifying of segmental units and suprasegmental units in the text and system annotating of the text to indicate the system-identified segmental units. If desired, the method can include system generation of synthesized speech modulated according to the annotations in the text. Also, or alternatively, if desired the method can include system comparison of uttered speech with acoustic units corresponding with the annotated text to facilitate recognition of text units corresponding with the uttered speech and outputting text recognized as corresponding with the uttered speech.

The system annotating of the text can comprise identifying of discourse-givenness, contrastiveness, and/or cue phrase lookups to identify and annotate text with discourse prominence or discourse non-prominence or other useful annotations and can be implemented on a computerized speech synthesizer having a suitably configured discourse engine.

Furthermore, the system annotating of the text can comprise dividing of a text sentence into groups of meanings and indicating the locations of long and short pauses, if desired. Dividing of the text can employ, optionally from first to last priority in the sequence set forth, punctuations, phrase length, high-level syntactic constituency, and balance and can be implemented on a computerized speech synthesizer having a suitably configured phrasing module.

Moreover, the system annotating of the text can comprise identifying, for each phrase in the text, a word, optionally an operative word, that introduces a new idea that carries the argument forward as the sentences progress, employing discourse, semantic, and/or syntactic properties of relevant words, and can be implemented on a computerized speech synthesizer having a suitably configured operative word engine.

Still further, the system annotating of the text can comprise identifying of consonants as sustainable or percussive, providing linking information, optionally direct linking, play and link, and/or prepare and link information, and adding connectives for vowels that are followed by another vowel and can be implemented on a computerized speech synthesizer having a suitably configured link-and-play engine.

Another option according to the invention is for the system annotating of the text to comprise representing intonation contours on a multi-level scale encompassing the pitch range of the speech to be synthesized or recognized and can be implemented on a computerized speech synthesizer having a suitably configured intonation engine.

The system annotating of the text can furthermore comprise identifying or applying intonational prominence according to whether a word is an operative or a non-operative word, a content or a function word, a monosyllabic or a polysyllabic word, or whether the syllable carries a primary, a secondary, or no lexical stress, and whether a syllable precedes a syllable with higher pitch and can also be implemented on the intonation engine.

System annotating of the text can also comprise identifying inflections or pitch movements of syllables based on their positions within a phrase and can be implemented on a computerized speech synthesizer having a suitably configured intonation engine.

In addition, system annotating of the text can comprise employing grapheme-phoneme pairs to identify relationships between text units and corresponding acoustic units. Usefully, each grapheme-phoneme pair can comprise a visible prosodic-indicating grapheme corresponding to the text to be pronounced and corresponding phonemes, the phonemes being functional in the digital domain wherein, optionally, each grapheme pair comprises a single grapheme and a single phoneme.

Any two or more compatible ones of the system annotating techniques described herein can be employed together in a method of speech synthesis or speech recognition according to the invention.

If desired the speech synthesis method can comprise system analysis of text to be spoken to select syllables, words or other text units to receive an expressive prosody and applying the expressive prosody to the selected syllables or words. The system analysis of the text to be spoken can comprise a linguistic analysis operable with or without semantic considerations and, optionally, wherein the text to be spoken comprises one or more discourses.

Furthermore, the speech synthesis method can comprise system linguistic analysis identifying and annotating operative words in a discourse for acoustic modulation of the lexical pronunciations of the operative words, optionally by applying a suitable intonation or intonations to give the operative words prominence.

In a further aspect, the invention provides a computer-implemented rule-based method of recognizing speech, the method comprising:

inputting uttered speech to be recognized to a computerized system;

system comparison of the uttered speech with acoustic units corresponding with annotated text to facilitate identification of text units corresponding with the uttered speech wherein the annotated text comprises the product of system identifying of segmental units and suprasegmental units in the text and system annotating of the text to indicate the system-identified segmental units; and outputting text recognized as corresponding with the uttered speech.

The speech recognition method can comprise identifying prosody-related acoustic features of a speech unit in the uttered speech input and employing the prosody-related acoustic features to facilitate identification of a corresponding text unit. The speech recognition method can comprise system annotating each text unit, optionally with coding or markings, to show the identified prosody-related acoustic feature visually in the output text, optionally employing a rules-based method of annotation to relate the annotations to the prosody-related acoustic features and/or to facilitate identification of a corresponding text unit.

The rules employed in a speech recognition method according to the invention can comprise rules to indicate an appropriate prosodic modulation of the lexical pronunciation of a syllable, word or other speech unit according to the context of the speech unit in a discourse containing the speech unit.

The invention also provides a computerized system comprising software to implement the speech synthesis method and/or the speech recognition method of the invention or both.

In a further aspect the invention provides a computerized system for synthesizing speech from text received into the system. The system can comprise a discourse engine configured to identify segmental units and suprasegmental units in the text and to annotate the text to indicate the system-identified segmental units. In addition, the system can comprise a speech recognition module configured to compare uttered speech with acoustic units corresponding with the annotated text and configured to identify text units corresponding with the uttered speech and to output text recognized as corresponding with the uttered speech.

BRIEF DESCRIPTION OF THE DRAWINGS

Some embodiments of the invention, and of making and using the invention, as well as the best modes contemplated for carrying out the invention, are described in detail herein, by way of example, with reference to the accompanying drawings, in which:

FIG. 3 illustrates another set of rules employable in the discourse engine illustrated in FIG. 2, which rules can identify contrastive pronouns;

FIG. 4 illustrates a list of cue phrases, which will not be identified as operative words, which list can be employed in the discourse engine illustrated in FIG. 2;

FIG. 5 illustrates a rule set which can be utilized in a phrasing module component of the text analysis system shown in FIG. 1, which phrasing module can insert phrase breaks and pauses;

FIG. 6 illustrates an example of operative word selection rules that can be employed in the system shown in FIG. 1 and that make use of semantic roles and grammatical relations;

FIGS. 7A-7C, which are to be read together in sequence as one figure, illustrate an example of operative word selection rules that can be employed in the system illustrated in FIG. 1 and that make use of part-of-speech ("POS") tags and syntactic constituents;

FIGS. 8A-C, which are to be read together in sequence as one figure, illustrate a rule set utilizable in a link-and-play engine component of the system illustrated in FIG. 1, which link-and-play engine can add playability information to consonant units;

FIG. 9 illustrates a rule set utilizable in an intonation engine component of the system illustrated in FIG. 1, which intonation engine can assign sentential stress levels to vowels;

FIG. 11 illustrates a rule set utilizable in an inflection module component of the system illustrated in FIG. 1, which inflection module can add pitch movements to syllables;

DETAILED DESCRIPTION

Figures 1, 2:
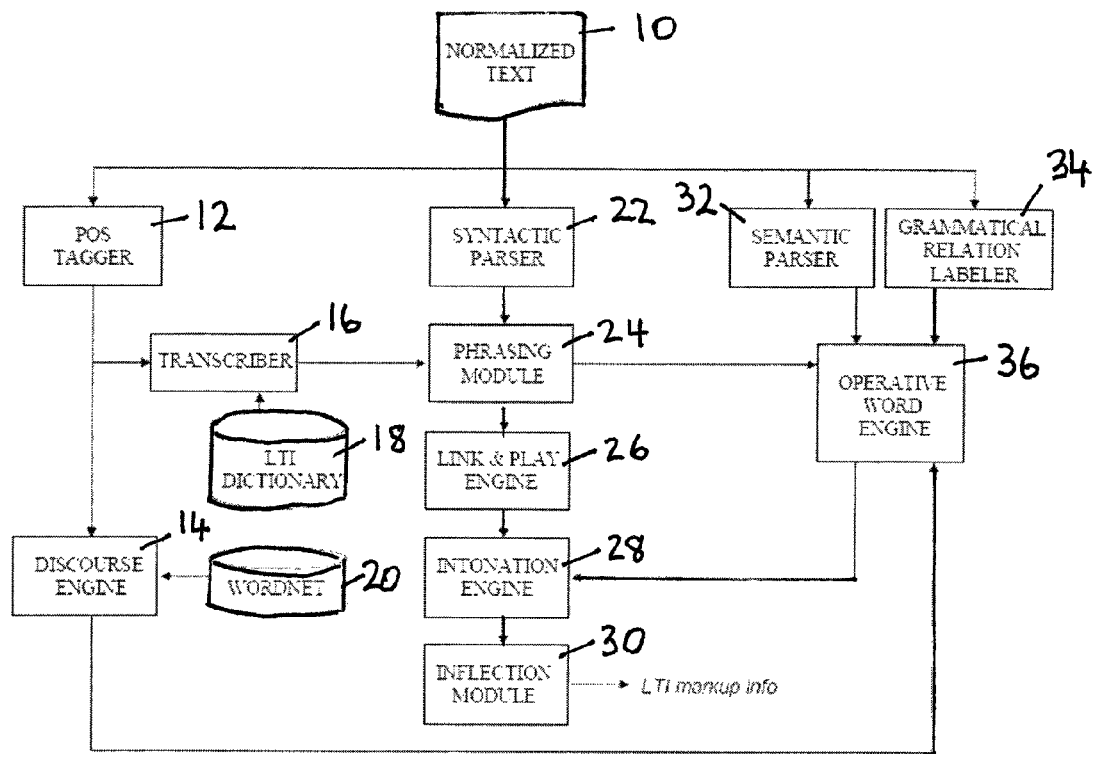
FIG. 1 illustrates a text analysis and annotation system in accordance with one embodiment of the present invention.
FIG. 2 illustrates a set of rules in a discourse engine employable in the text analysis system shown in FIG. 1, which rules can identify which words carry discourse-given information.

Broadly stated, the invention provides a computerized or digitized method to automatically or machine annotate the relationship between text and acoustic units. The method of the invention can employ one or more of the following steps:

- Rule-based annotation of segmental units, for example consonants and/or vowels and suprasegmental units, for example intonations, and phrase breaks or other breaks or pauses;
- Identifying discourse prominence or (non-) prominence based on discourse-givenness, contrastiveness, and/or cue phrase lookups;
- Dividing a sentence into small groups of meanings and identifying pause locations based on, from first to last priority, punctuations, phrase length, high-level syntactic constituency, and/or balance;
- Identifying, for each phrase, an operative word, for example, a word that introduces a new idea that carries the argument forward as the sentences progress, based on discourse, semantic, and syntactic properties of words;
- Identifying musical qualities of consonants in various word positions;
- Representing intonation contours on a pitch change scale which can be normalized to a particular subset of an individual speaker's overall vocal pitch range, if desired;
- Identifying intonational prominence based on whether the word constitutes an operative or a non-operative word, a content or a function word, a monosyllabic or a polysyllabic word, whether the syllable carries a primary, a secondary, or no lexical stress, and whether the syllable precedes a syllable with very high pitch;
- Identifying inflections or pitch movements of syllables based on their phrasal positions.

The present invention provides a rule-based, general method for constructing a parser to automatically analyze and annotate text to be synthesized as expressive speech.

The inventive method can include validating predictive rules for the relationships among extended texts to be pronounced, the analysis of said texts, predictions of phrasings, articulations, intonations, inflections, and rhythms for expressive human speech, and the identification of acoustic units to be assembled as concatenated speech representing a defined speaking style or prosody.

One embodiment of the inventive system disclosed uses a single voice, one speaking style, and a single acoustic prediction for acoustic units to be manipulated and synthesized as concatenated speech. This example is representative of a general method of the invention which can be applied to a variety of speaking styles, dialects, and prosodies.

The text to be spoken, annotated with a desired prosody as described herein, can be spoken by a machine, for example a computerized speech synthesizer, which interprets the annotations to apply the desired prosody. Alternatively, a human speaker or speakers can read from and speak the text, interpreting the annotations and applying the desired prosody.

The methods of the invention can be implemented in software on computerized hardware of any desired configuration having suitable input/output, data processing and data storage capabilities, to provide systems embodying the invention.

The methods and systems of this invention can be used in a variety of applications, including voice training, speech synthesis, and speech recognition.

In another aspect the invention provides a system-implemented method of applying prosody to system-generated speech to provide expressiveness, the method comprising system analysis of text to be spoken to select syllables, words or other text units to receive an expressive prosody and applying the expressive prosody to the selected syllables or words.

The system analysis of the text to be spoken can be a linguistic analysis operable with or without semantic considerations. The text to be spoken can comprise a sentence or one or more discourses and the linguistic analysis can identify and annotate operative words in a sentence or discourse for acoustic modulation of the lexical pronunciations of the operative words. Such acoustic modulation can, if desired, be effected by applying a suitable intonation or intonations, which can give the operative words prominence. A suitable intonation can comprise an increase in stress, or a change of pitch, or both. Either the increase in stress or the change of pitch can, if desired, be varied during the system-generation of a corresponding speech unit. Modulation can be effected utilizing other physical parameters that will change a listener's perception of the corresponding speech unit, if desired.

Operative words can be system-identified in any suitable manner by analysis of a discourse and considering the role of a particular word, syllable or other text unit in relation to its context and, optionally, to the discourse considered as a whole. Any one or more of a variety of parameters can be employed to identify one or more operative words in a body of text, for example, the newness of the text unit in the body of text, the contrastiveness of the text unit in relation to another text unit in the body of text, phrase breaks, the semantic role of the text unit, the grammatical role of the text unit, the part-of-speech of the text unit, syntactic analysis, or any other desired parameter.

Thus, in some system embodiments the invention can synthesize speech from novel text, which is to say, text not previously processed by the system, and provide the synthesized speech with a system-determined expressiveness appropriate for the text which, if desired, can have a particular prosody style, for example a reportorial or human interest style.

In a further aspect the invention provides a computerized method of speech recognition wherein human-readable text output is generated from uttered speech input, the method comprising identifying prosody-related acoustic features of a speech unit in the uttered speech input and employing the prosody-related acoustic features to facilitate identification of a corresponding text unit.

If desired, the text unit can be annotated in a suitable manner, for example, with coding or markings, to show the identified prosody-related acoustic feature visually in the output text. Also, a rules-based method of annotation can be employed to relate the annotations to the prosody-related acoustic features. Furthermore, if desired, the rules-based method of annotation can be employed to facilitate identification of a corresponding text unit.

Also, the rules employed can comprise rules to indicate an appropriate prosodic modulation of the lexical pronunciation of a syllable, word or other speech unit according to the context of the speech unit in a discourse containing the speech unit.

Embodiments of the inventive speech recognition method can be employed for training speakers to improve their pattern of speech. For example, in one embodiment the system receives uttered speech from a speaker, interprets the uttered speech in terms of lexical pronunciation units and modulations thereof applied by the speaker and generates a different pattern of modulations having a different expressiveness from that applied by the speaker. Linguistic rules, with or without semantic parameters, can be used to determine appropriate modulations for individual speech units. The different pattern of modulations can be presented visually to the speaker with annotations indicating the new modulations, and may also be made audible to the speaker, or output to an audio file.

As shown in FIG. 1, the inventive system comprises a number of modules which can be employed to process a normalized text 10. The text can be passed onto the part-of-speech (POS) tagger 12, the syntactic parser 22, the semantic parser 32, and the grammatical relation labeler 34.

In order to obtain correct pronunciation units and predict intonation for a given text, the system employs a part-of-speech tagger to apply a part-of-speech ("POS") tag to every word. The Stanford POS tagger v.2006-05-21 available at //nlp.stanford.edu/software/tagger.shtml can be used for this function. This is a high entropy part-of-speech tagger. The use of the Stanford POS tagger v.2006-05-21 is for illustrative purpose only and any other suitable part-of-speech tagger can be employed. The information obtained from the POS Tagger 12 can be then employed in the following components of the inventive text analyzer: the transcriber 16, the discourse engine 14, and the intonation engine 28.

The transcriber 16 communicates with the LTI dictionary 18 in order to produce Lessac pronunciation units for input words. The LTI dictionary 18 can be adapted from the CMU Pronouncing Dictionary 0.6 available at www.speech.cs.cmu.edu/cgi-bin/cmudict, or another suitable dictionary which gives phonemic representations of vowels, consonants, and lexical stress of more than 100,000 words. The vowels and consonants can be automatically transformed into the Lessac units as defined in Lessac (1996) and described in U.S. Pat. Nos. 6,847,931, 6,865,533 and 6,963,841. While most of the symbols used in the CMU dictionary can directly be changed into the Lessac units, there are cases where transformation may not be straightforward. Generally, the Lessac system makes more fine-grained distinctions than what is found in generally published American English dictionaries, including the CMU dictionary. For example, the vowel AA in the CMU dictionary can correspond to either Lessac's #4, as in the word odd, or #5, as in the word a n. In such cases, the Lessac pronunciation unit can be manually entered, or modified, if desired. Desirably, the particular dictionary 18 employed covers some known fraction of all the words found in the corpora to be parsed and synthesized and is selected according to the nature of the text, scientific, medical, technical, generally educated reading, etc. In addition to words and their corresponding pronunciations, the LTI dictionary 18 can contain another column that identifies parts of speech for homographs that have different pronunciations and can be disambiguated by the part of speech, e.g., live (v) vs. live (adj). After receiving words together with their parts of speech information, the Transcriber 16 matches them with entries in the dictionary 18, producing, for example, the following output for the sentence Sydney already left home:

S N21 D N Y0_ 30 L R N31 D Y0_L N31 F T_H 211 M
| | | | | |
a b c d e f g

As shown, the symbols representing the consonant and vowel sounds are separated by a space. The underscore indicates where a word boundary is located. Here since the mappings of consonant graphemes to sound symbols are routine, only the vowel units will be described in detail. Note that the dictionary 18 can be useful in cases where a grapheme can match to more than one sound and it can be difficult to formulate a general rule to account for the case, ex. gh in rough vs. gh in though. All the vowels end with the number 0, 1, or 2, which signify that the vowel carries no lexical stress, a primary stress, or a secondary stress respectively. Then, according to Lessac (1996), vowels can be categorized into tonal NRG vowels, structural NRG vowels, and neutral vowels. Tonal NRG is "a vibrative energy state relating to a phonation, voice production, tonal resonance, stentorian quality, and vocal expressiveness and a natural relaxing agent integrally joined in a one-to-one relationship with the emotional experiencing system" (p. 276). Tonal NRG vowels include the Y-buzz as in tea or sing (in the above example, the symbol Y is used for the Y-buzz), and the +Y-buzz as in gate or length. Structural NRG is "a kinesthetic and yawnlike NRG state that is related to facial posture and refers to the mold, shape, and size of the vocal sound box that self-regulates color, body, warmth, and esthetics of vocal tone and provides continuing tension relief for the jaw, neck, and throat areas" (pp. 275-6). In the above example, (c) and (g) constitute some of the structural NRG vowels. Arthur Lessac used numbers to represent the vowels in this category. Each number corresponds to the size of the lip opening when the vowel is pronounced. The smaller the number is, the smaller the lips open. Table 1 below briefly illustrates the vowel numbering system.

TABLE 1

| #1 | #21 | #3 | #4 | #5 | #51 | #6 |
|---|---|---|---|---|---|---|
| School | Ode | All | Odd | Arm | Down | Add |
| Two | Boat | Law | Bond | Large | South | Ask |
| Crude | Told | Bought | College | Father | Found | Class |

The remaining vowel in the above example, (a), (d) and (f) can be placed in the neutral vowel category. These vowels are characterized by their short duration. Four neutral vowels are postulated, which are $N^1$ as in "took", $N^2$ as in "tick", $N^3$ as in "tech", and $N^4$ as in "tuck".

To help provide and predict natural-sounding intonation for a sentence as well as a paragraph, a discourse engine 14 can be incorporated. This component of the system can address three issues: discourse-givenness, contrastiveness, and cue phrases. Previous work (e.g., Hirschberg 1993, Horne et al. 1993) disclosed that words carrying discourse-given information can be assigned a non-focal accent.

If desired, text analysis can be performed on a discourse being a body of text larger than a sentence which can, if desired, comprise the entire text-to-be-processed. Alternatively, the text-to-be-processed can be divided into a number of discourses. The boundaries of an individual discourse can be determined in any desired manner. For example, a discourse can, if desired, comprise: a number of sentences, such as a number in the range from 2 to about 20 sentences; a number of paragraphs, for example a number in the range of from 1 to about 20 paragraphs; one or more chapters; or desired quantitative linguistic or grammatical value. Alternatively, or in addition, a discourse can comprise a body of text relating to one or more conversations, arguments, stories, verbal interchanges, subjects, topics, items or the like.

By employing a discourse as a text unit in some embodiments of the systems and methods of the invention, it is possible for a computerized system to speak the text with an expressiveness different from what can be system determined by analysis of an individual sentence. The difference can impart improved expressiveness to the spoken discourse which can be relevant to the content of the discourse in a way that analysis of a sentence in isolation may not achieve.

Information that is assumed by a speaker to be shared by a listener or listeners is sometimes called 'given' information as used in that sentence herein. Given information often is common knowledge or something which has been previously established in the discourse. Given information can be distinguished from new or newly introduced information. Often, a human speaker may give new information greater emphasis than given information.

The term "prominence" is used herein to include the marking of words as being perceptually salient. Such words can be perceived as standing out from surrounding words. Prominence can be associated with an increase in any one or more of the frequency of the voice fundamental, F0, of duration, of intensity or of spectral precision.

The term "contrastive" is used herein to include a word or phrase which contrasts another sentence or element of a sentence. Disjunctive conjunctions like 'but', 'or', or 'though' can serve a contrastive function. Contrastive items can be found in sentences or elements of a sentence which are in a relationship of syntactic contrast to one another, for example "Tom" and "Jack" are contrastive items in the sentence "Tom wants to go there, but Jack doesn't". In common human speech contrastive items often receive intonational prominence.

Cue phrases refer to words and phrases that may explicitly mark discourse segment boundaries.

In some embodiments of the present invention, discourse-given words can be identified by a rule set such as is shown in FIG. 2. The rules can first check the part of speech of each word and keep a history of every noun, verb, adjective, and adverb as the system reads through a given paragraph. When a word occurs a second time, the word is marked as "given". If no match is found, the word can be added to the history. Here a morphological analyzer, or a semantic lexicon such as WordNet 20 (available at http://wordnet.princeton.edu), can be consulted to obtain the base forms of words before adding words to the history and finding a match. Any desired morphological analyzer can be utilized to get the base forms of words. WordNet 20 can be useful when the system is extended to find a match based on the semantics of words, for example as described in Hiyakumoto et al. (1997). At the end of the paragraph, the history is cleared and all the words in history are output.

Some items may be designated as non-focal, while contrastive items generally receive intonational prominence (see, for example, Bolinger 1961). In one aspect, the present invention addresses a group of contrastive items, for example stressed pronouns, which "occur often in natural speech and are almost always contextually given" (Prevost 1995:57). The discourse engine 14 can contain a set of rules that identifies some pronouns as contrastive items. One embodiment of suitable rules can be found in FIG. 3. The rules can search for parallel constructions and identify a pronoun in the second constructs as "contrastive." A further component in the discourse engine 14 employs a table lookup of cue phrases such as is shown in FIG. 4. Litman and Hirschberg (1990) demonstrated that discourse and sentential sense of cue phrases can have different intonational characteristics. In the present invention, differences between the discourse and the sentential sense can be reflected in the fact that cue phrases that are used as discourse markers are not candidates for operative words and thus may not receive intonational prominence. The listed cue phrases can be skipped when the operative word engine 36 tries to find operative words.

As shown in FIG. 1, in addition to the POS Tagger 12, the normalized text 10 proceeds to another three components of the system: a syntactic parser 22, a semantic parser 32, and a grammatical relation labeler 34. For the syntactic parser 22, the present invention can employ, for example, Carnegie Mellon University's Link parser 4.0 available at www.link.cs.cmu.edu/link/, which can be a syntactic parser based on link grammar, for the purpose of obtaining syntactic constituents to use in later components, such as a phrasing module 24, and an operative word engine 36. The operative word engine 36 additionally can employ thematic roles and grammatical relations. In some embodiments of the current invention, semantic roles can be derived from Boxer (Bos 2005), a tool that produces Discourse Representation Structures (DRS). For grammatical relations, embodiments of the present invention can use output from a CCG parser (Clark and Curran 2004), which can be based on Combinatory Categorial Grammar (Steedman 2000). The tools cited herein are for illustrative purposes only. Other tool(s) that can provide syntactic trees, semantic roles, and/or grammatical relations or other functions as is apparent from the context can be employed in practicing the invention, of ordinary skill in the art, as will be, or become, apparent to a person of ordinary skill in the art.

The phrasing module 24 can divide a sentence into small groups of meanings and indicate the locations of breath pauses. While punctuation can be employed for phrasing purpose, they may not be sufficient. Knowles et al. (1996) stated that speakers are likely to insert a prosodic boundary when a phrase exceeds a certain length. In some embodiments of the invention, the Phrasing module 24, for example as shown in FIG. 5, can assign phrase breaks to a given text based on punctuation, phrase length, syntactic constituency, and/or balance. The rules employed predict the locations of primary and secondary phrase breaks for a given sentence. Both types of breaks can divide the sentence into small chunks of meanings. Primary breaks correspond to long pauses in speech. As for secondary breaks, those whose occurrences coincide with a comma signify short pauses. The remaining secondary breaks do not have any pause correlate.

After the Transcriber 16 provides pronunciation units for words, the number of syllables can be calculated and used in the Phrasing module 24. If a phrase is too long, the phrase can be divided until its number of syllables falls within the limit. The specification of word numbers as a condition for secondary-to-primary break transformation helps prevent interruption of sentence flow caused by unnecessary insertion of a long pause. After break transformation, if the number of the syllables within a chunk still exceeds a certain number, the system can obtain syntactic constituents of the sentence from the syntactic parser 22, look for a long subject within that chunk and put a primary break between the subject and the predicate.

If a long subject is not found, the system can, if desired, proceed to find one of the defined patterns and insert a primary break after the word preceding the pattern on the condition that the previous primary break is not too close. When none of the defined patterns is found, the system can assign a primary break in the middle of the chunk, desirably at a point coinciding with a syntactic boundary, for example, the end of the nearest noun phrase. In contrast to known methods for assigning phrase breaks, for example that described by Atterer (2000), the phrase break rules employed in some embodiments of the invention do consider higher syntactic structures. In addition, in practicing the present invention, the balancing factor can be given a low priority, if desired, unlike Atterer's phrase break assignment which appears to be driven by the balancing factor.

After the operation of the Phrasing module 24, the text contains both primary and secondary phrase breaks. Information regarding these breaks can be useful for the selection of operative words, for example, as is described herein.

As used herein, an "operative" word refers to a word that introduces a new idea that carries the argument forward as the sentences progress. Generally, each successive phrase or other sense group division has an operative word. Operative words are often pronounced with higher pitch.

FIG. 6 illustrates an example of rules that can reside in the operative word engine 36. The operative word engine 36 illustrated can receive "contrastive" and "given" information from the discourse engine 14, or in other suitable manner. Since contrastive pronouns can often be assigned stress by a speaker, which may correspond to higher pitch, the operative word engine 36 can, if desired, designate contrastive pronouns as operative words.

A word carrying "given" information can be understood as not introducing a new idea and therefore will not usually be considered to be an operative word. In some embodiments of the invention, an operative word can be understood as comprising a patient, theme, agent, or predicate of a given sentence. Sometimes, in spoken language, arguments are more frequently accented than are predicates. One useful hierarchy of arguments is shown in FIG. 6. Such a rules set can, if desired, be established experimentally, for example from Lessac practioners' identification of operative words in a set of 550 sentences or another suitable body of sentences or other text. Each sense group of the text usually contains at least one operative word. In some embodiments of this invention, a sense group corresponds to a group of words between any two phrase breaks generated by the phrasing module 24. In one embodiment of the invention, for each sense group, if no operative word is already present and the phrase is not a cue phrase, the operative word identification rules can look for and select a specified argument or a predicate according to a predetermined hierarchy such as is described above. The rules can then check to see if the selected element has a modifier.

The operative word engine 36 can receive semantic roles from the semantic parser 32, and modifiers can be identified by the grammatical relation labeler 34. If a modifier exists, the rule can mark it as an operative word. If no modifier can be found, the selected element can become an operative word. If the engine finds a word that is marked as "given" or belongs to or constitutes a discourse marker, it can proceed to the next rule. For each sense group, the operation can complete when an operative word is identified.

In an alternative embodiment, the system of the invention may omit a semantic parser 32, and can instead select operative words based on grammatical relations provided by the grammatical relation labeler 34. In one example, a hierarchy of the most to the least likely candidate for operative words is: object>subject>verb.

Another embodiment of the invention omits both the semantic parser 32 and the grammatical relation labeler 34, and can use part-of-speech ("POS") tags and syntactic constituents to find operative words. Some exemplary rules for such a system are shown in FIGS. 7A-C.

The transcriber 16 can provide the text to be spoken with base Lessac pronunciation units and lexical stress. Then, the phrasing module 24 can mark the text with primary breaks, following which system processing can advance to the link-and-play-engine 26. The link-and-play-engine 26 can add playability information to consonant units, if desired. The link-and-play-engine 26 can contain a set of rules, such as is shown in FIGS. 8A-C, that, following Lessac's speech principles, can identify whether a consonant is sustainable or percussive, can generate linking information, for example direct linking, play and link, prepare and link information, and add connectives when selected vowels can be followed by another vowel. For example, given the input of the base units shown in the previous example, the link-and-play-engine 26 can output:

S N21 DcU N Y0 cYa_30 LcT R N31 D Y0_L N31 FcT TcF_H 211 McT

| | | | | | | | | | | | | a    b   c    d    e   f    g    h    i   j    k    l which can be transformed into the following markup:

$Sydney_y$ already left home.

(a), (c), (f), (g), (h), and (k) are consonants before a vowel. Because these consonants are felt so briefly as a person moves toward the pronunciation of the upcoming vowel, they are not playable and thus are not marked. The cU tag marked (b) signifies that the sound is prepared. This can occur when there is a sequence of two sounds with the same or nearly the same points of articulation. In this case, the speaker can prepare the first consonant, for example by putting the lips and the tongue in the position for the first consonant, and fully executing the following identical or cognate consonant. This ensures that the first consonant will not be dropped in speech. Preparation of a consonant can be marked by a slash through the consonant. Next, as the first word ends with the Y-buzz vowel and the vowel is followed by another vowel, the Y-connective (cYa) can be added. The phones with the cT tag, e.g., (e), (i) and (l), are sustainable. Finally, the cF tag, as seen in (j), indicates that the phone should be played as a percussive consonant and linked to the next word. The above is exemplary of a method of automated annotation which can code, markup or annotate text with an expressive prosody pursuant to the teachings of the Lessac voice training system. Other automated annotation methods that can be employed will be or become apparent to a person of ordinary skill in the art. The teachings of other speech training or voice coaching systems, for example the methods of Kristin Linklater of Columbia University theater division, or other methods, can be employed and applied, if desired. A comparison between Lessac consonant units provided by the link-and-play-engine 26 and the IPA units is shown in Table 2 below.

TABLE 2

| IPA consonant | Lessac consonant | Example |
| --- | --- | --- |
| t | T | tall |
|  | TcD | get it |
|  | TcF | get him |
|  | TcP | get down |
|  | TcS | software |
|  | TcU | softness |
| d | D | dog |
|  | DcD | good actor |
|  | DcF | good boy |
|  | DcP | good time |

TABLE 2-continued

| IPA consonant | Lessac consonant | Example |
|---|---|---|
| | DcS | advance |
| | DcU | roundtrip |
| ʃ | SH | shall |
| | SHcD | wash up |
| | SHcG | wash clean |
| | SHcP | wash shirts |
| | SHcT | washcloth |

As the same consonant can be pronounced differently depending on the surrounding sounds, this information of how consonants should be pronounced given the identity of the next sound can be encoded in the units given by the link-and-play-engine 26, if desired. The consonant t represents a percussive sound and its pronunciation can vary depending on whether the next sound is a vowel, as in get it, a consonant with a different place of articulation, as in get him, or a consonant with the same place of articulation, as in get down. Unlike t or d, the sound sh is sustainable. While the tags cF and cS can be used with percussive sounds, cG and cT can be reserved for sustainable sounds. In addition, the consonant tags can provide information about the position of the sound: word-initial (no tag), word-medial (cS, cT, cU), or word-final (cD, cF, cG, cP). Compared to IPA units, such Lessac units are usually richer in information regarding the nature of the sound (percussive or sustainable), and its position within the word. Enriched consonant units from the link-and-play-engine 26 together with vowel units and lexical stress from the LTI dictionary 18 can then be fed into the intonation engine 28, if desired, or processed in other suitable manner.

At this stage, the system has the following information that the intonation engine 28 can utilize: base vowel units, lexical stress, part-of-speech tags, phrase breaks, and operative words. The Intonation engine 28 can assign stress levels to base vowel units. In one embodiment of the invention, a 5-level scale can be employed to represent pitch variation among different syllables. The assignment of stress levels to vowels can be based on rules of expressiveness such as are described or referenced herein. The rules can be derived from the practices of reputable speech writers and orators as well as reputable script writers and actors, together with other contextual variables.

For example, operative words can be pronounced with great prominence. If desired, content words can receive more intonational prominence than function words. Words that can be classified as content words include nouns, verbs, adjectives, and adverbs. Function words can be determiners, prepositions, pronouns, and conjunctions. Finer-grained distinctions than usually can be generated manually can be useful to produce more accurate intonation markups. For example, quantifiers can be separated from determiners and grouped with content words for intonation markup purposes. Furthermore, degree of sentential stress can be varied with degree of lexical stress, if desired. In general, stressed syllables in a word can receive higher degree of sentential stress than unstressed syllables. In addition, polysyllabic words can display a downtrend pitch pattern. As a result, syllables with similar degrees of stress at word level can be assigned different sentential stress levels depending on their positions within a word. Still further, a pitch rise can take a longer time to implement. Therefore, a rule can be included in the intonation engine 28 to globally adjust the stress level of a syllable preceding a syllable with a high stress level.

Figure 10:
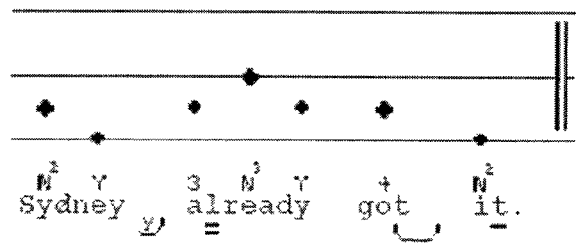
FIG. 10 is a graphical representation of a sentence employing markups indicating proper pronunciation according to the Lessac system for context-sensitive expressiveness have been applied.

An exemplary set of rules for assigning intonation is shown in FIG. 9. A graphical example of the use of the rules applied to a short sentence is shown in FIG. 10. The marked up sentence shown in FIG. 10 can be rendered with automated annotations, pursuant to the present invention, in the following manner:

Sydney/NNP    already/RB    got/VBD   it/PRP

S N21 DcU N Y0 cYa_30 LcT R N31 D Y0_G 41 TcD_N21 TcS

N22iH    Y1iL    32iL    N33iH    Y2iL    42iH    N21iL

Given the sentence "Sydney already got it." the previously described modules can provide part-of-speech tags, operative word (underlined), base vowel symbols, and lexical stress (the last number in the vowel unit, 0=unstressed, 1=primary-stressed, 2=secondary-stressed). Since already is an operative word, its primary-stressed vowel can be assigned a large dot (iH) at level 3. The following syllable receives a small dot (iL) at level 2, reflecting that it is an unstressed syllable and together with the preceding syllable, displays a downtrend pitch pattern. The first syllable of the word is unstressed and thus assigned iL. With respect to the level, it initially receives level 1. However, since it precedes a level-3 vowel, it undergoes a global adjustment rule and its level can be changed to 2. The words Sydney and got constitute content words. Through the operation of the intonation assignment rules, the primary-stressed vowels can be assigned 2iH, and the unstressed vowels 1iL. Finally, it is a pronoun, and thus a function word. The vowel can be represented by a small dot (iL) at level 1 even though at the lexical level, the vowel carries a primary stress.

If desired, vowel units can be further specified with inflections. Inflections can refer to pitch movements, which can take various shapes. In an embodiment of this invention, the inflection module 30 can add any one or more of an upglide (fU), a downglide (fW), an upcircumflex (fC), a downcircumflex (fI), a level sustention (fS), or no inflection (fN) to the vowels.

FIG. 11 demonstrates an exemplary set of inflection assignment rules, which can be formulated by analyzing a corpus of sentences marked up with appropriate inflections for a given prosody style by Lessac or other qualified speech practitioners. If desired, certain text locations can be annotated with any one of a variety of inflection choices, as can be the case in natural speech. Other inflection assignment rules can be formulated if desired, experimentally, empirically, theoretically or in other suitable manner.

Table 3 presents a comparison between IPA and Lessac vowel units. The same or similar vowel sounds can have different acoustic properties depending on what level of lexical stress is applied and where the vowel is located in a sentence. The Lessac system can provide vowel units that include information concerning lexical stress, pitch level, and pitch movement providing richer vowel units than the IPA vowels.

TABLE 3

| IPA vowel | Lessac vowel | Example |
|---|---|---|
| a | 53iHfN | Large |
| | 52iHfW | large |

TABLE 3-continued

| IPA vowel | Lessac vowel | Example |
|---|---|---|
| | 52iHfD | large |
| | 52iHfS | large |
| | 52iLfN | arcane |
| | 51iLfN | arcane |
| ei | +Y3iHfD | gate |
| | +Y3iHfN | gate |
| | +Y3iHfW | gate |
| | +Y2iHfN | gate |
| | +Y2iHfW | gate |
| | +Y2iLfN | cadre |
| | +Y1iLfN | cadre |
| ʊ | N13iHfN | pull |
| | N12iHfN | pull |
| | N12iHfW | pull |
| | N12iLfN | fulfill |
| | N11iHfN | outlook |
| | N11iLfN | fulfill |

Operation of the various described components of the system, can provide an output which comprises consonant units with playability information, vowel units with intonation and inflection information, and phrase breaks.

Figure 12:
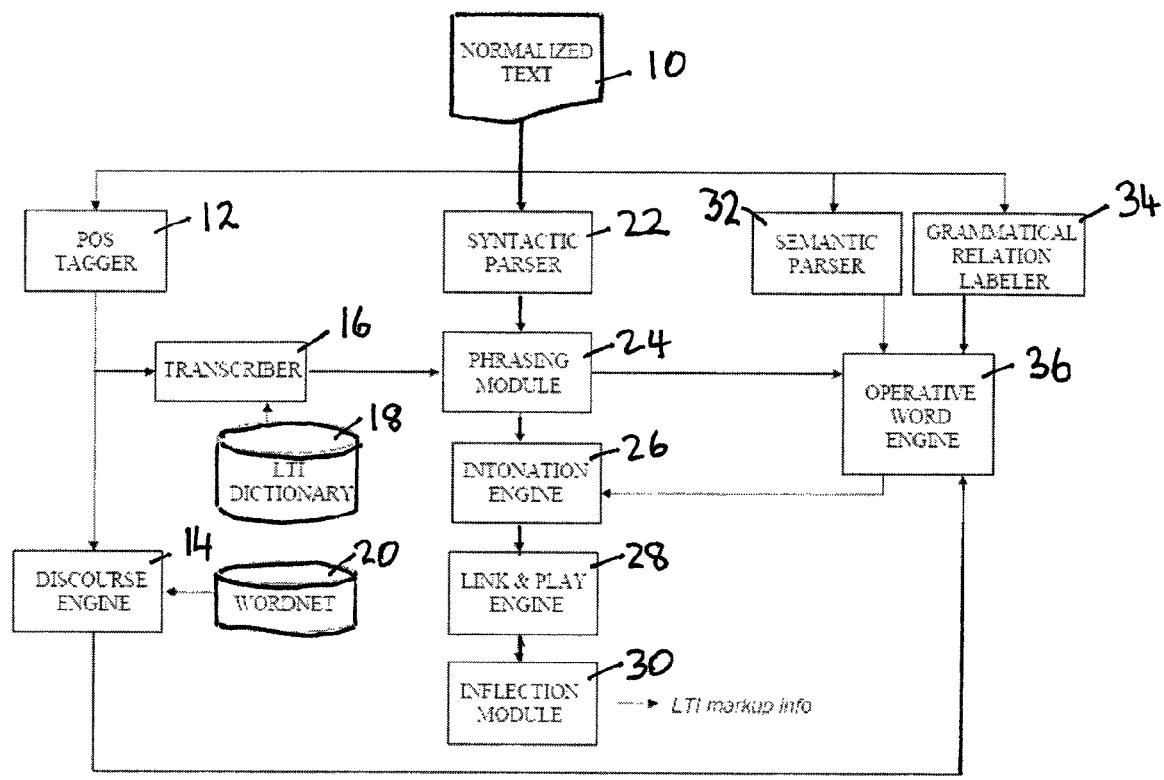
FIG. 12 illustrates a first alternative embodiment of a text analysis and annotation system according to the present invention.
Figure 13:
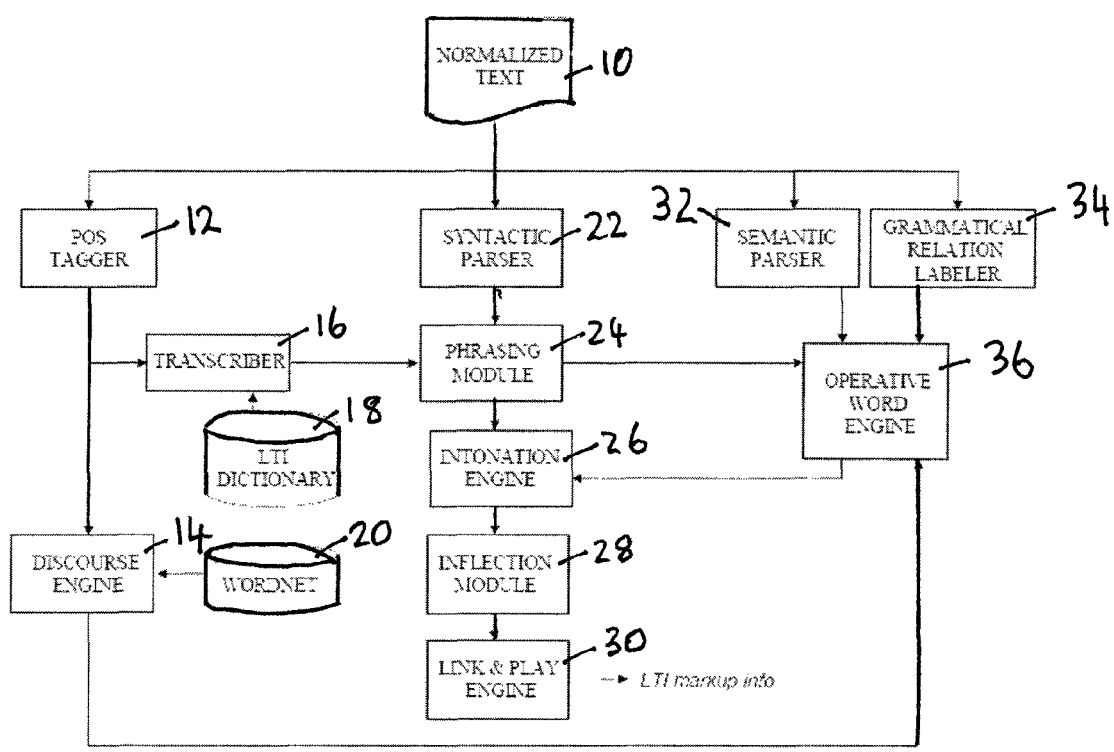
FIG. 13 illustrates a second alternative embodiment of a text analysis and annotation system according to the present invention.

A variety of alternative embodiments of the present invention can be employed, as will be or become apparent to a person of ordinary skill in the art. For example, if enriched consonant units are not to be used in the system, until later processing stages, the link-and-play-engine 26, which adds playability information to consonant units, can be placed after the intonation engine 28, for example as shown in FIG. 12, or after the inflection module 30, as demonstrated in FIG. 13.

The disclosed invention can be implemented using various general purpose or special purpose computer systems, chips, boards, modules or other suitable systems or devices as are available from many vendors. One exemplary such computer system includes an input device such as a keyboard, mouse or screen for receiving input from a user, a display device such as a screen for displaying information to a user, computer readable storage media, dynamic memory into which program instructions and data may be loaded for processing, and one or more processors for performing suitable data processing operations. The storage media may comprise, for example, one or more drives for a hard disk, a floppy disk, a CD-ROM, a tape or other storage media, or flash or stick PROM or RAM memory or the like, for storing text, data, phonemes, speech and software or software tools useful for practicing the invention. Alternatively, or in addition, remote storage may be employed for data and/or programs, which may be retrieved as needed, for example across the internet.

The computer system may be a stand-alone personal computer, a workstation, a networked computer or may comprise distributed processing distributed across numerous computing systems, or another suitable arrangement as desired. Files and programs useful in implementing the methods of the invention can be located on the computer system performing the processing or at a remote location.

Software useful for implementing or practicing the invention can be written, created or assembled employing commercially available components, a suitable programming language, for example Microsoft Corporation's C/C++ or the like, Also by way of example, Carnegie Mellon University's FESTIVAL or LINK GRAMAR (trademarks) text parsers can be employed as can other applications for natural language processing that are known or become known to a person of ordinary skill in the art, for example, dialog systems, automated kiosk, automated directory services and other tools or applications.

Various embodiments of the invention can be useful for the generation of appealing, humanized machine speech for a wide range of applications, including audio or spoken books, magazines, newspapers, drama and other entertainment, voicemail systems, electronically enabled appliances, automobiles, computers, robotic assistants, games and the like.

Such embodiments of the invention can express messages and other communications in any one or more of a variety of expressive prosody styles including, but are not limited to, reportorial, persuasive, advocacy, human interest, excited, serious, poetic, and others. Other embodiments of the invention can help train speakers to speak with a desired style or can modify the expressiveness of uttered speech, and optionally, transform the speech to have a different prosodic style.

The description of known art herein may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited herein, no admission is made that the document is pertinent to the claimed invention or that the field of the document, which may be quite different from that of the invention, is analogous to the field or fields of the present invention.

Disclosures Incorporated. The entire disclosure of each and every U.S patent and patent application, each foreign and international patent publication, of each other publication and of each unpublished patent application that is specifically referenced in this specification is hereby incorporated by reference herein, in its entirety.

The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art. Should there appear to be conflict between the meaning of a term as used in the written description of the invention in this specification and the usage in material incorporated by reference from another document, the meaning as used herein is intended to prevail.

Throughout the description, where processes are described as having, including, or comprising specific process steps, it is contemplated that the processes of the invention can also consist essentially of, or consist of, the recited processing steps. It should be understood that the order of steps or order for performing certain actions is immaterial so long as the invention remains operable. Moreover, two or more steps or actions may be conducted simultaneously.

While illustrative embodiments of the invention have been described above, it is, of course, understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

LIST OF BACKGROUND PUBLICATIONS
INCLUDING PUBLICATIONS REFERENCED
HEREIN

M. Atterer, Assigning Prosodic Structure for Speech Synthesis via Syntax-Prosody Mapping, Master's thesis, University of Edinburgh (2000).

J. Bachenko & E. Fitzpatrick, "A Computational Grammar of Discourse-Neutral Prosodic Phrasing in English," Computational Linguistics, vol. 16, pp. 155-170 (1990).

D. Bolinger, "Contrastive Accent and Contrastive Stress," Language, vol. 37, pp. 83-96 (1961).

J. Bos, "Towards Wide-Coverage Semantic Interpretation," Proceedings of Sixth International Workshop on Computational Semantics (IWCS-6), pp. 42-53 (2005).

S. Clark & J. R. Curran, "Parsing the WSJ using CCG and Log-Linear Models," Proceedings of the 42d annual Meeting of the Association for Computational Linguistics (ACL-04), pp. 104-111, Barcelona, Spain (2004).

A. Cruttenden, Intonation, Cambridge: Cambridge University Press (1991).

J. Gee & F. Grosjean, "Performance Structures: A Psycholinguistic and Linguistic Appraisal," Cognitive Psychology, vol. 15, pp. 411-458 (1983).

J. Hirschberg, "Pitch Accent in Context: Predicting Intonational Prominence from Text," Artificial Intelligence, vol. 63, pp. 305-340 (1993).

L. Hiyakumoto et al., "Semantic and Discourse Information for Text-to-Speech Information," Concept to Speech Generation Systems, Proceedings of a Workshop Sponsored by the Association for Computational Linguistics, pp. 47-56 (1997).

M. Horne et al., "Referent Tracking in Restricted Texts Using a Lemmatized Lexicon: Implications for Generations of Intonation," Proceedings of the European Conference on Speech Techonology, pp. 2011-2014 (1993).

G. Knowles et al., Working with Speech, London: Longman (1996).

D. R. Ladd, Intonational Phonology, Cambridge: Cambridge University Press (1996).

A. Lessac, The Use and Training of the Human Voice: A Bio-Dynamic Approach to Vocal Life, Third Edition, Boston: McGraw-Hill Higher Education (1996).

D. Litman & J. Hirschberg, "Disambiguating Cue Phrases in Text and Speech," Proceedings of the 13$^{th}$ Conference on Computational Linguistics, pp. 251-256 (1990).

J. Ohala & W. Ewan, "Speed of Pitch Change," Journal of the Acoustical Society of America, vol. 53, p. 345 (1973).

S. Prevost., A Semantic of Contrast and Information Structure for Specifying Intonation in Spoken Language Generation, PhD diss., University of Pennsylvania (1995).

E. Selkirk. Phonology and Syntax: The Relation Between Sound and Structure, Cambridge, Mass.: MIT Press (1984).

M. Steedman, The Syntactic Process, Cambridge, Mass.: MIT Press (2000).

J. Sundberg, "Maximum Speed of Pitch Changes in Singers and Untrained Subjects," Journal of Phonetics, vol. 7, pp. 71-79 (1979).

The invention claimed is:

1. A computer-implemented rule-based method of synthesizing speech from text, the method comprising:
   inputting text to be machine spoken to a computerized system;
   system identifying of segmental units and suprasegmental units in the text;
   system annotating of the text to indicate the system-identified segmental units; and
   system generation of synthesized speech modulated according to the annotations in the text;
   wherein the system annotating of the text comprises identifying of discourse-givenness, contrastiveness, and/or cue phrase lookups to identify and annotate text with discourse prominence or discourse non-prominence.

2. A method according to claim 1 wherein the system annotating of the text comprises identifying of consonants as sustainable or percussive, providing linking information, and adding connectives for vowels that are followed by another vowel.

3. A method according to claim 1 wherein the system annotating of the text comprises identifying inflections or pitch movements of syllables based on their positions within a phrase.

4. A method according to claim 1 comprising system analysis of text to be spoken to select syllables, words or other text units to receive an expressive prosody and applying the expressive prosody to the selected syllables or words.

5. A method according to claim 4 wherein the system analysis of the text to be spoken comprises a linguistic analysis operable with or without semantic considerations and wherein the text to be spoken comprises one or more discourses.

6. A method according to claim 5 wherein the linguistic analysis comprises identifying and annotating operative words in a discourse for acoustic modulation of the lexical pronunciations of the operative words by applying a suitable intonation or intonations to give the operative words prominence.

7. A method according to claim 1 wherein system annotating of the text employs grapheme-phoneme pairs to identify relationships between text units and corresponding acoustic units wherein each grapheme-phoneme pair comprises a visible prosodic-indicating grapheme corresponding to the text to be pronounced and a corresponding phoneme or phonemes, the phoneme or phonemes being functional in the digital domain.

8. A method according to claim 1 wherein the system annotating of the text comprises dividing of a text sentence into groups of meanings and indicating the locations of long and short pauses, employing punctuations, phrase length, syntactic constituency, and balance.

9. A method according to claim 8 wherein the system annotating of the text comprises identifying, for each phrase in the text, an operative word introducing a new idea to carry the argument forward as the sentences progress, the method employing discourse properties, semantic properties, and/or syntactic properties of relevant words.

10. A method according to claim 9 wherein the system annotating of the text comprises representing intonation contours on a pitch change scale encompassing the pitch range of the speech to be synthesized or recognized.

11. A method according to claim 10 wherein the system analysis of the text to be spoken comprises a linguistic analysis and the linguistic analysis comprises identifying and annotating operative words in a discourse for acoustic modulation of the lexical pronunciations of the operative words by applying a suitable intonation or intonations to give the operative words prominence.

12. A computer-implemented rule-based method of synthesizing speech from text, the method comprising:
   inputting text to be machine spoken to a computerized system;
   system identifying of segmental units and suprasegmental units in the text;
   system annotating of the text to indicate the system-identified segmental units; and
   system generation of synthesized speech modulated according to the annotations in the text;
   wherein the system annotating of the text comprises dividing of a text sentence into groups of meanings and indicating the locations of long and short pauses, employing syntactic constituency, and balance.

13. A computer-implemented rule-based method of synthesizing speech from text, the method comprising:
    inputting text to be machine spoken to a computerized system;
    system identifying of segmental units and suprasegmental units in the text;
    system annotating of the text to indicate the system-identified segmental units; and
    system generation of synthesized speech modulated according to the annotations in the text;
    wherein the system annotating of the text comprises identifying, for each phrase in the text an operative word introducing a new idea to carry the argument forward as the sentences progress, the method employing discourse properties, semantic properties, and/or syntactic properties of relevant words.

14. A method according to claim 13 wherein system annotating of the text employs grapheme-phoneme pairs to identify relationships between text units and corresponding acoustic units wherein each grapheme-phoneme pair comprises a visible prosodic-indicating grapheme corresponding to the text to be pronounced and a corresponding phoneme or phonemes, the phoneme or phonemes being functional in the digital domain.

15. A computer-implemented rule-based method of synthesizing speech from text, the method comprising:
    inputting text to be machine spoken to a computerized system;
    system identifying of segmental units and suprasegmental units in the text;
    system annotating of the text to indicate the system-identified segmental units; and
    system generation of synthesized speech modulated according to the annotations in the text;
    wherein the system annotating of the text comprises representing intonation contours on a pitch change scale encompassing the pitch range of the speech to be synthesized or recognized.

16. A method according to claim 15 wherein the system annotating of the text comprises identifying or applying intonational prominence according to whether a word is an operative or a non-operative word, a content or a function word, a monosyllabic or a polysyllabic word, or whether the syllable carries a primary, a secondary, or no lexical stress, and whether a syllable precedes a syllable with higher pitch.

17. A computer-implemented rule-based method of recognizing speech, the method comprising:
    inputting uttered speech to be recognized to a computerized system;
    system comparison of the uttered speech with acoustic units corresponding with annotated text to facilitate identification of text units corresponding with the uttered speech wherein the annotated text comprises the product of system identifying of segmental units and suprasegmental units in the text and system annotating of the text to indicate the system-identified segmental units; and
    outputting text recognized as corresponding with the uttered speech.

18. A method according to claim 17 comprising identifying prosody-related acoustic features of a speech unit in the uttered speech input and employing the prosody-related acoustic features to facilitate identification of a corresponding text unit.

19. A method according to claim 17 comprising system annotating each text unit, with coding or markings, to show the identified prosody-related acoustic feature visually in the output text, employing a rules-based method of annotation to relate the annotations to the prosody-related acoustic features and/or to facilitate identification of a corresponding text unit.

20. A method according to claim 17 wherein the rules comprise rules to indicate an appropriate prosodic modulation of the lexical pronunciation of a syllable, word or other speech unit according to the context of the speech unit in a discourse containing the speech unit.

* * * * *